United States Patent [19]

Perenon et al.

[11] Patent Number: 5,186,777
[45] Date of Patent: Feb. 16, 1993

[54] PROCESS FOR THE MANUFACTURE OF A COMPOSITE MOLDED STRUCTURE, AND ESPECIALLY OF A SKI

[75] Inventors: Jacques Perenon, Voiron; Maurice Pichon, La Murette; Henri C. Deborde, Bilieu Charavines; Francois Jodelet, Voiron, all of France

[73] Assignee: Skis Rossignol S.A., France

[21] Appl. No.: 614,502

[22] Filed: Nov. 16, 1990

[30] Foreign Application Priority Data

Nov. 23, 1989 [FR] France .................. 89 15673

[51] Int. Cl.⁵ ................. B32B 5/20; B29C 67/22
[52] U.S. Cl. ............................. 156/79; 156/90; 156/245; 264/45.2; 264/46.5; 264/46.6; 280/610
[58] Field of Search .......... 264/45.2, 46.5, 46.6, 264/323; 156/79, 78, 90, 156, 285, 245; 280/610

[56] References Cited

U.S. PATENT DOCUMENTS

| | | | |
|---|---|---|---|
| 2,976,577 | 3/1961 | Gould | 264/46.6 |
| 3,135,640 | 6/1964 | Kepka et al. | 264/45.2 |
| 3,563,845 | 2/1971 | Stevens | 156/79 |
| 3,726,953 | 4/1973 | Jones et al. | 264/323 |
| 3,733,380 | 5/1973 | Ishida | 264/46.5 |
| 3,746,604 | 7/1973 | Reynolds | 264/46.5 |
| 3,816,573 | 6/1974 | Hashimoto | 264/46.5 |
| 3,911,190 | 11/1975 | Myers et al. | 264/46.5 |
| 4,259,274 | 3/1981 | Tiitola | 264/46.5 |
| 4,471,020 | 9/1984 | McCarthy | 156/90 |
| 4,590,023 | 5/1986 | Hayashi et al. | |
| 4,681,725 | 7/1987 | Maruyama | 264/46.5 |
| 4,891,081 | 1/1990 | Takahashi et al. | 156/78 |
| 4,953,885 | 9/1990 | Comert et al. | 280/610 |

FOREIGN PATENT DOCUMENTS

| | | |
|---|---|---|
| 0047038 | 3/1982 | European Pat. Off. . |
| 1806433 | 8/1969 | Fed. Rep. of Germany . |
| 1124600 | 10/1956 | France . |
| 2130758 | 11/1972 | France . |
| 2553669 | 4/1985 | France . |
| 3698894 | 7/1963 | Switzerland . |

Primary Examiner—Michael W. Ball
Assistant Examiner—Daniel J. Stemmer
Attorney, Agent, or Firm—Parkhurst, Wendel & Rossi

[57] ABSTRACT

The invention relates to a process for manufacturing a composite molded structure including the steps of: depositing first and second members in a mold; inserting at least one flexible plastic membrane between the first and second members so as to form a sheath when the mold is closed; closing the mold; injecting into the sheath reactants intended to react to form a foam which expands in situ and stretches the sheath until it forces the members flat against the walls of the mold; cooling the contents of the mold; and opening the mold to withdraw the composite molded structure.

5 Claims, 7 Drawing Sheets

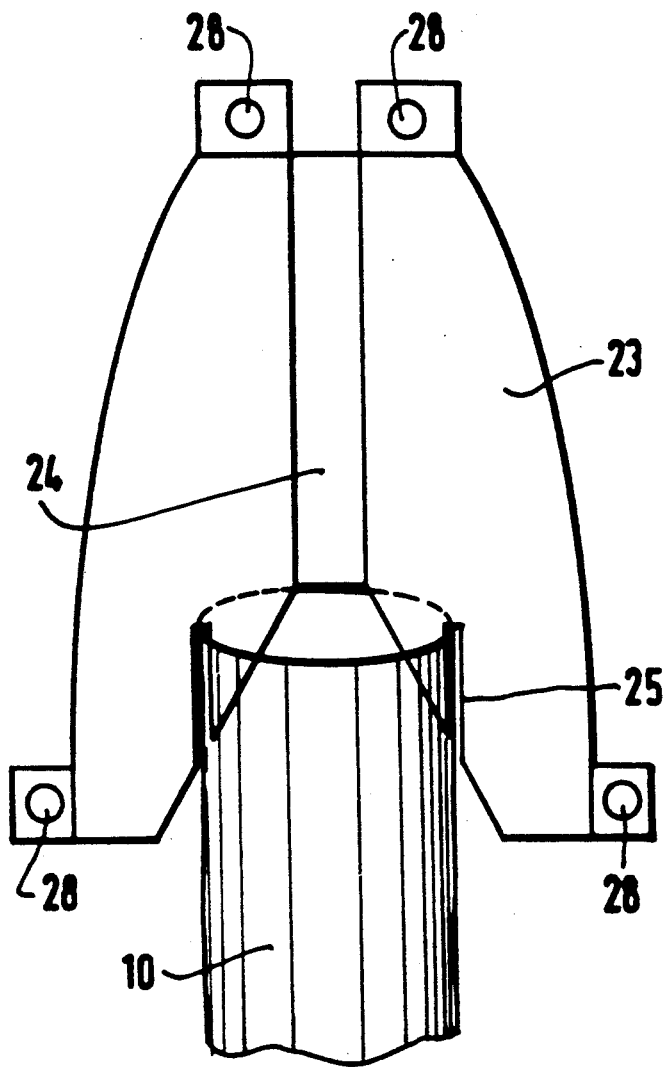
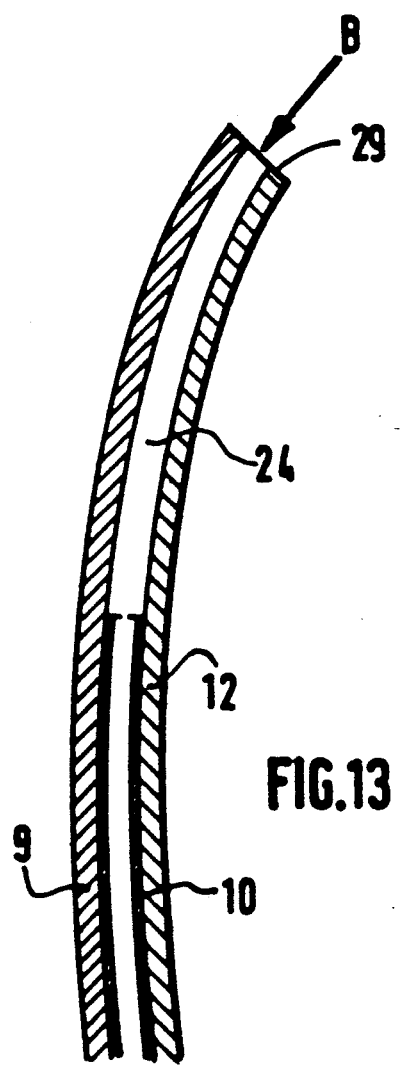
FIG.12
FIG.13

PROCESS FOR THE MANUFACTURE OF A COMPOSITE MOLDED STRUCTURE, AND ESPECIALLY OF A SKI

BACKGROUND OF THE INVENTION

The invention relates to a process for the manufacture of a composite molded structure. It also relates to the composite molded structures thus obtained.

A "composite molded structure" means a molded structure containing:

members, especially for stiffening and/or strengthening, which are either in the form of threads or in the form of sheets or even in the form of plates;

protective members;

various mechanical members such as, for example, those for damping, reducing weight, etc.

optionally, decorative members.

There exist a number of industrial processes capable of producing the assembly of these structures. There may be mentioned:

The so-called "wet route" process, is described, for example, in document FR-A-1,124,600, corresponds to a stacking of freshly adhesive-coated members. This process is nevertheless found to be lengthy to implement, difficult to automate and additionally, requires precautions in use.

The "dry route" adhesive bonding process empoys pre-impregnated members or dry films. This process is found to be easier to automate and above all less boiling. However, this process is found to be difficult to use, bearing in mind the very strict conditions of implementation which are inherent in the specifics of prepregs. In addition, in using the so-called "dry route" process it is difficult to obtain "surface on surface" adhesive bondings in which the adhesive joint is free from microbubbles which tend to weaken the structure obtained.

The assembly process using in-situ injection of resin (expansive or otherwise), is described, for example, in the document FR-A-2,130,758.

Whatever the industrial process employed, it is easy to produce so-called "sandwich" structures with a section of rectangular shape. The constituent members of such a structure are easily positioned either by stacking or by pressing on supports produced for this purpose.

In contrast, when it is desired to produce more complex, nonplanar shapes, or ones exhibiting changes in shape along the line of the product in question, a number of solutions are known at present.

First of all, the use of shaped shells, in which the various members precoated with adhesive are arranged, or into which the resins are injected. This process is found to be costly, bearing in mind the additional operations of producing the shell.

It is also known to employ either the pressure produced by the expansion of polyurethane (see, for example, the document U.S. Pat. No. 4,590,023), or the pressure of air inside inflatable tubes (see, for example, the document CH-A-369,894) to obtain a laying of the casing members flat against the inner walls of the shaped mold. However, in the former case, a free space must be arranged in the mold, for example, by means of spacers, the space intended to be filled up by the expanded polyurethane foam, giving rise to an increased complexity in the arrangement of the molds. Moreover, the casing members can, as already stated, be preimpregnated with a resin capable of interacting with the polyurethane and hence impairing the properties sought after in the structure obtained. Finally, in some cases the polyurethane foam acts as an adhesive bonding between the lower and upper casing members of the structures. It has been found that this adhesive bonding nevertheless remained limited in effectiveness and could be employed only for some applications.

The second case, namely the use of air injected into bags, is employed above all with the aim of lightening the structure. Consequently, hollow cellular objects without a core are obtained, whose behavior and stiffness are sometimes incompatible with some applications of such structures.

Lastly, it is always possible to obtain special shapes by machining. This machining uses up material, is found to be costly in view of this additional operation, and does not enable all the desired structures to be obtained. What is more, it can affect the unity and continuity of the structure and hence the related physical properties. Furthermore, the production of a decoration is made more difficult, because this process rules out the possibility of a flat predecoration.

SUMMARY OF THE INVENTION

The present invention is aimed at remedying these disadvantages. It offers a process for the manufacture of a molded structure capable of exhibiting a section capable of varying along the lengthwise axis of the structure, which is easy to implement, low in cost, and which makes it possible to have full control of the mechanical and physical properties of the structure obtained.

This process for the manufacture of a composite molded structure consisting of a plastic foam core, reinforced over its periphery by a set of two half-casings, an upper one and lower one respectively, consisting of strengthening, protective, damping, decorative or other members, includes the steps of:

depositing in a mold a first subassembly intended to form the first half-casing;

depositing in this same mold a second subassembly intended to form the second half-casing;

closing the mold;

then, injecting between these two subassemblies reactants intended to react to form a foam which expands in situ until each of the subassemblies is laid flat against the walls of the mold;

then, cooling the contents of the mold;

and finally, in opening the mold to withdraw the composite molded structure obtained.

The process in accordance with the invention is one in which, when the first and the second subassemblies are stacked in the mold, two flexible plastic membranes are inserted between the upper half-casing and the lower half-casing, the membranes defining, when the mold is closed, a sheath into which the reactants of the foam are injected.

This operation, in fact, constitutes the only operation of the molding of the molded structure.

In other words, the present invention consists in that, by starting with standard members and employing membranes of a suitable material, it is possible to produce molded composite structures whose section can vary along the lengthwise axis of the said structures, this being done by exploiting the elasticity, the flexibility and the geometry of certain components and the foam expansion. It should be noted that the replacement of the flattening using injection of air into "sausage skins", by foam expansion, especially of polyurethane foam was not usually essential, as witness, on the one hand, the long time which has elapsed since the knowledge of the former (air) process and, on the other hand and above all, the fact that, in accordance with the invention, it is indispensable that the membranes should exhibit on one face good adhesiveness to the foam and, on the other face, good adhesiveness to the impregnating epoxy resin. Such adhesive characteristics are important especially in order to guarantee the resistance to delamination and to shearing of the various stackings, such as the half-casings, both on the foam constituting the core of the structure and on the laminate of the two half-casings constituting the reinforcement of the structure.

Advantageously, in practice, under the molding conditions the membranes combine a good tear resistance and a good temperature behavior. In fact, to make it easier to deform the half-casings it may be necessary to raise the temperature of the mold to 180° C.;

Further two half-casings add the membranes are superposed flat in the mold, or resting against the lower inner wall of the mold before the latter is closed and the components of the foam are injected;

The membranes are impervious to the products generated during the expansion of the foam and to the various resins present in the molten state during the conditions for producing the composite molded structure. It is recommended, in fact, to prevent any mixing of the two resins, namely the resin for impregnating the constituent members of the half-casings, when this is the case, and the polyurethane foam. Additionally, the membranes constitute an adhesive bonding intermediary under the conditions of use. In fact, during an operation of molding a structure, this feature makes it possible to use simultaneously, while isolating them, two chemically different components which, were they in contact with each other during the molding stage, would either react in an undesirable manner or would be incompatible with each other.

An outcome of the present invention is therefore the possibility of a simultaneous use of two chemically different components providing advantageous structure qualities, besides an advantage from a technological standpoint;

the membranes are chosen so that the injected foam adheres to their inner wall and that the resins preimpregnating the half-casings also adhere to their outer wall, thus constituting the adhesive bonding intermediary between the foam and the resin impregnating the half-casings;

the membranes are made of a damping viscoelastic elastic material, thus constituting a damping film surrounding the foam core of the structure;

the membranes are made of a material chosen from the group consisting of thermoplastc polyurethanes, amide-block polyethers, and nitrile-modified amide-block polyethers;

the membranes form an integral part of the half-casings and are added onto the latter;

the membranes are of composite structure consisting of at least two superposed layers of materials, namely an inner layer compatible with the resin constituting the expanded foam core, and an outer layer compatible with the resin employed in the stacking of the lower and/or upper half-casings, at least one of these two layers providing the adhesive joint between the two layers and the overall imperviousness of the said membranes; however, this function may be provided by a film of appropriate adhesive or any other means;

the two membranes may consist of a single tubular sheath capable of being stretched at least in the plane of its section;

the stretchable tubular sheath is produced, after extrusion, by folding back and welding a flat film of uniform or variable thickness;

the film is a hot-melt adhesive;

each of the two half-casings consists of a stacking comprising at least one layer of strengthening;

some of the constituent members of the stacking are impregnated with an adhesive resin;

the two half-casings are partially or wholly preformed before being introduced into the mold, depending on the definitive form which they are assumed to adopt;

the mold cavity has a complex section which produces at the plane of the joint a gap intended to receive part of the two half-casings, whose distance is not greater than the sum of the thicknesses of the two half-casings under the conditions of injection of the reactants intended to form the foam, in order to permit, when the foam expands, the sliding of the side edges of the half-casings into the gap, and to allow them to lie flat against the walls of the mold in step with the process;

the molded composite structure has the shape of a girder and the injection of the reactants into the tubular sheath is performed near one of the ends of the girder;

the side ends of the upper half-casing are folded inwards at the base of the side walls of the mold when it is placed in position before the mold is closed, the expansion of the foam causing them to unfold and simultaneously to be laid flat against the said side walls of the mold. This embodiment eliminates the pinching of the two half-casings in the gap of the mold and hence the operation of trimming the structure produced in the mold.

The present invention also relates to a process for the manufacture of a molded ski consisting of a composite molded structure. This process is distinguished in that it includes the following steps:

in depositing on the bottom of a mold a first set comprising a runner whose side edges comprise the ski edges, a stiffening member precoated with adhesive and a textile strengthening sheet preimpregnated with a heat-curable resin;

depositing on this first set a flattened tubular sheath of plastic capable of being stretched in at least the plane of its section, capable of adhering both to the foam of the core and to the preimpregnating resin;

depositing above this stretchable tubular sheath a second set comprising a preimpregnated textile sheet, a stiffening member precoated with adhesive and a transparent decorated thermoplastic plate;

closing the mold;

then injecting the reactants of the foam into the tubular sheath through one of its ends;

and finally, after the sufficient polymerization period, cooling the contents of the mold and opening this mold to withdraw the ski thus obtained.

Advantageously, in practice:

the mold cavity has a practically trapezoidal, rectangular, square, elliptical, circular or more complex section;

after demolding, the side walls situated at the plane of the joint are cut;

the edges are inclined;

the two inclined edges and the upper face are strengthened continuously by the same textile reinforcing member;

the injection of the reactants of the foam takes place via the ski tip;

the injection of the reactants of the foam takes place via the truncated section of the ski tip;

the injection of the reactants of the foam into the sheath takes place by means of a channel extending between an orifice traveling along the ski tip as far as the point of inflection of the ski tip in relation to the remainder of the ski, the said channel being defined by a suitably shaped insert positioned in the mold between the two half-casings and having cutouts intended to permit the fastening of the sheath in order to obtain a correct injection of the reactants into the latter;

the injection of the reactants constituting the foam takes place via the heel.

Finally, the present invention also relates to the skis obtained according to the process described above. These skis are distinguished in that they comprise, between the two half-casings, a viscoelastic sheath surrounding the core, adhering to the latter and to the two half-casings, thus permitting the corresponding elastic shearing of the half-casings over the core.

The way in which the invention may be implemented and the advantages which stem therefrom will emerge better from the example of embodiment which follows, which is given by way of guidance and without any limitation being implied, in support of the attached figures.

BRIEF DESCRIPTION OF THE DRAWINGS

FIG. 12 is a diagrammatic illustration of the insert intended to permit the injection of the reactants via a truncated end of a ski.

FIG. 13 is a lengthwise section in the plane, of the insert of FIG. 12.

DETAILED DESCRIPTION OF THE INVENTION

The first example which will be described concerns the manufacture of a composite molded structure which could be employed within the scope of the manufacture of sailboards, water ski and the like, without departing from the scope of the present invention.

Figure 1:
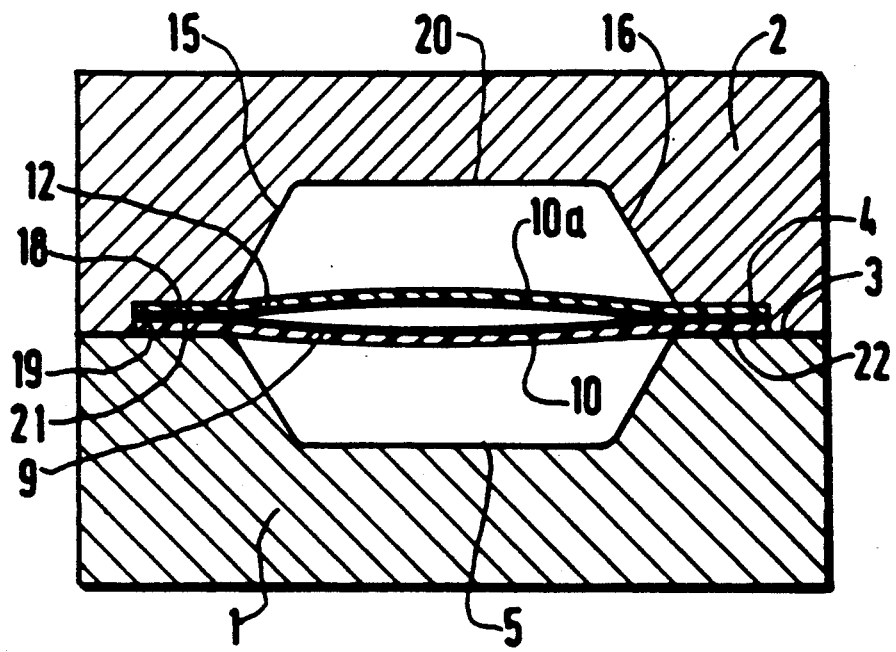
FIG. 1 shows a cross-section of the mold before the injection of the reactants which form the foam.
Figure 2:
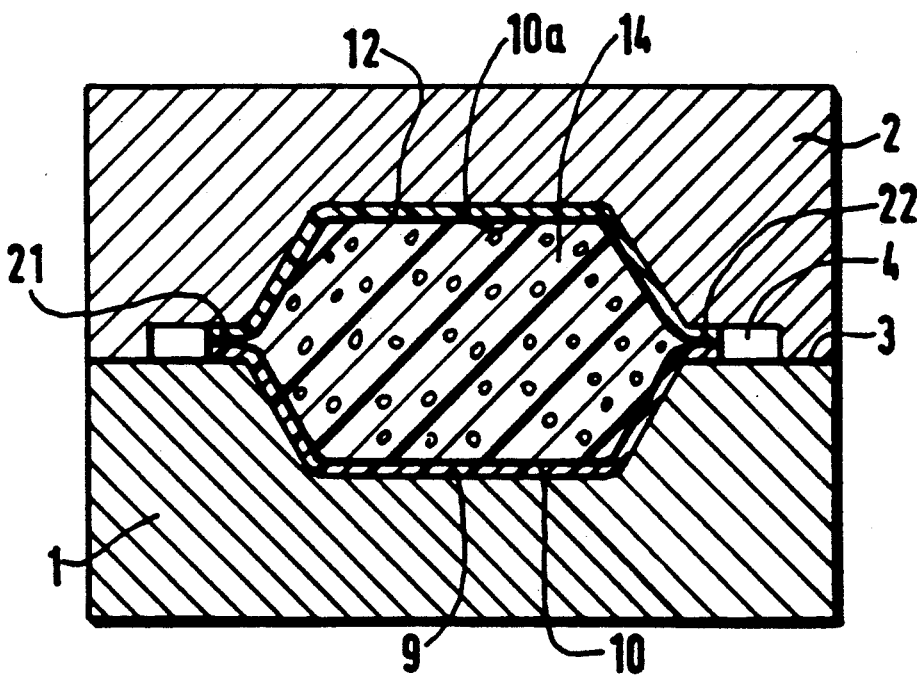
FIG. 2 is a cross-section of the mold after expansion of the foam.

According to the invention, and as can be seen in FIGS. 1 and 2, a first subassembly or half-casing (9) is deposited at the plane of the joint (3) of a mold defined by its upper (2) and lower (1) cavities. More precisely, this half-casing (9) rests at the plane of the joint (3) by means of its side ends (19). This first half-casing may advantageously consist of a textile sheet preimpregnated with a heat-curable, for example epoxy, resin.

Two flexible membranes (10, 10a) made of plastic are then deposited on this lower half-casing (9). The two side ends (21, 22) of these membranes are practically pinched at the plane of the joint (3) of the mold.

A second, upper half-casing (12) of the same kind as the first is then deposited over these membranes. As a result, a stacking is obtained, whose side ends are inserted into a gap (4) arranged in the immediate vicinity of the plane of the joint.

It should be noted that in this example the two half-casings, the lower (9) and upper (12) ones, respectively, are semi-rigid when cold and are capable of being deformed when heated. Nevertheless, it is quite conceivable within the scope of the invention to provide partially or even wholly preformed half-casings, and only the membranes (10, 10a) are then pinched at the plane of the joint as the mold closes. In another embodiment, the membranes (10, 10a) may form an integral part of the half-casings, the lower one (9) and upper one (12) respectively. In this case they are attached onto the inner face of the half-casings by any suitable means, and especially by adhesive bonding.

On account of their pinching at the gap (4) of the mold, the membranes (10, 10a) define an impervious sheath inside the mold.

The mold is then closed and heated. The injection of the constituents of the polyurethane foam, namely isocyanate and polyol, into the sheath thus formed (10, 10a) is then carried out. These components react and expand in situ in a known manner, causing the two half-casings (9, 12), made flexible and deformable under the effect of the temperature, to be laid flat on the bottom (5) and against tee upper wall (20) of the mold respectively. Correspondingly, there is a slight retraction of the side edges (18, 19) of the half-casings and (21, 22) of the membranes (10, 10a). Moreover, there is adhesion of the resins preimpregnating the half-casings (9, 12) to the outer wall of the membranes (10, 10a) and adhesion of the foam (14) to the inner wall of the same membranes (10, 10a), without, however, these two resins coming into contact, bearing in mind the imperviousness of the membranes. The latter are advantageously made of amide-block polyether. Nevertheless, they can be multicomponent and then consist, for example, of three superposed layers:

an inner layer, compatible with the polyurethane foam core (14);

an outer layer, compatible with the resins for impregnating the upper (12) and lower (9) half-casings;

a middle layer, capable of providing the bonding and the adhesion between the first two layers, and additionally capable of ensuring the imperviousness of the resulting membrane.

FIG. 2 shows the appearance of the mold after expansion of the polyurethane foam.

Figure 3:
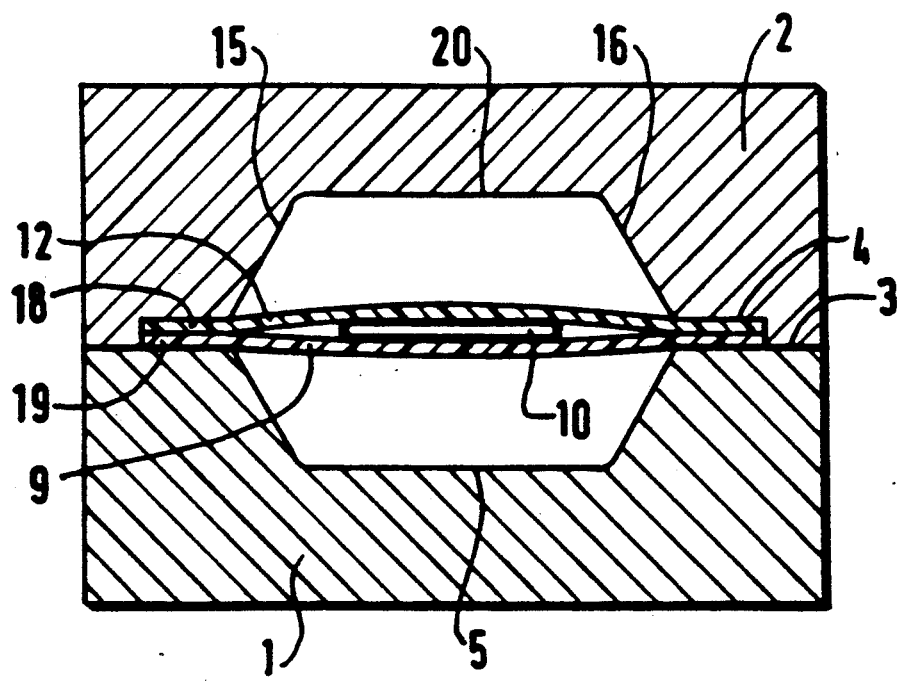
FIG. 3 shows a section similar to that of FIG. 1 within the scope of another embodiment.
Figure 4:
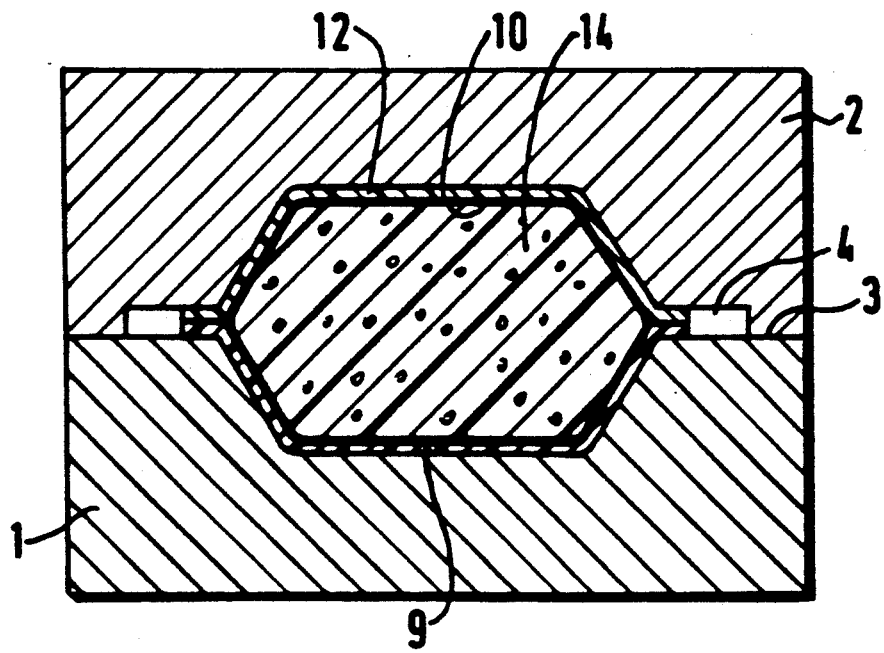
FIG. 4 is a section similar to that of FIG. 2 within the scope of the same embodiment as that of FIG. 3.

In another embodiment, shown in FIGS. 3 and 4, the membranes (10, 10a) are replaced by a stretchable tubular sheath (10). First of all, a first half-casing (9) is arranged flat at the plane of the joint (3) of the mold (1,2). The tubular sheath (10), made of stretchable plastic, is then deposited on this first half-casing (9). As can be ascertained, this tubular sheath (10) does not, have to extend over the whole width of the half-casing (9).

over the whole width of the half-casing (9).

Finally, a second half-casing (12), of the same kind as the first, is deposited flat over the first half-casing (9) and the tubular sheath (10). As a result, a stacking is obtained, whose side ends are inserted into the gap (4) arranged in the immediate vicinity of the plane of the joint.

The operating procedure is then the same as that described above, the reactants being injected into the sheath (10).

Figure 5:
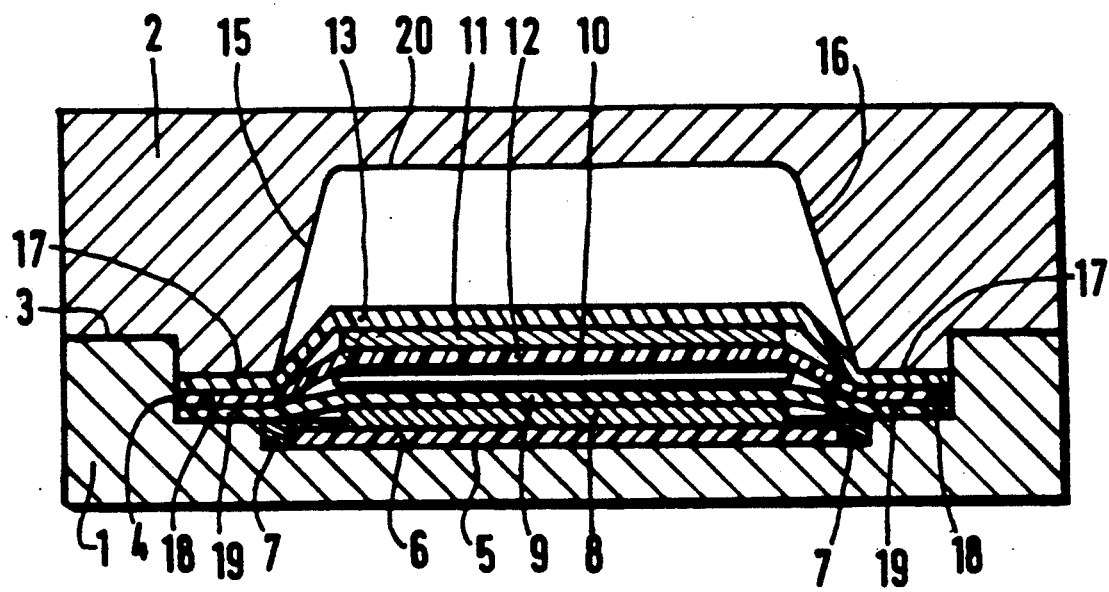
FIG. 5 is a cross-section of the mold with the various members forming part of the composition of a molded ski structure in accordance with the invention, before the injection of the reactants which form the foam.
Figure 6:
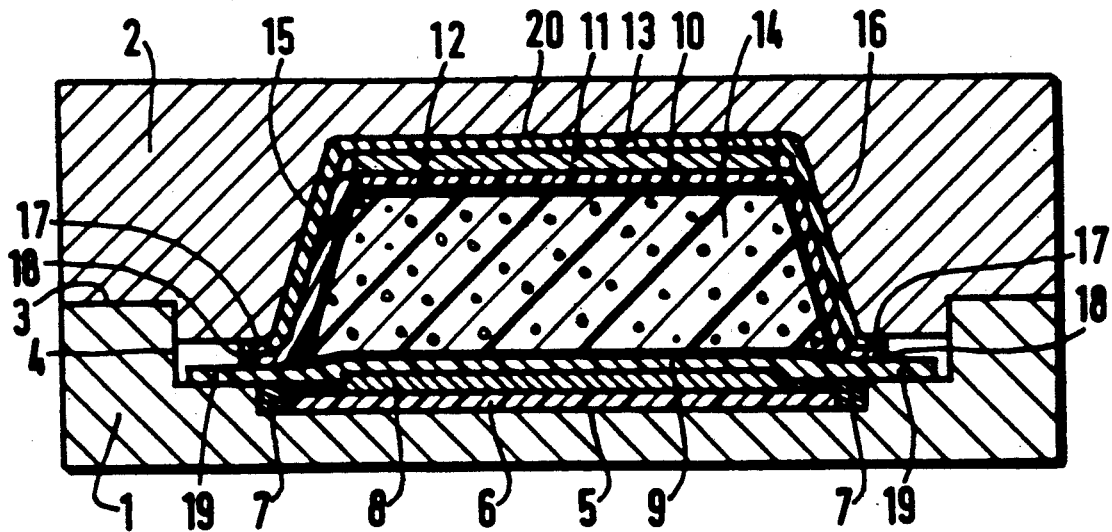
FIG. 6 shows a cross-section of the latter mold after expansion of the foam.

A special example of embodiment concerns the manufacture of a ski of composite molded structure, shown in FIGS. 5 and 6. A first member (6) corresponding to the runner of a ski is placed on the bottom (5) of the lower cavity (1) of the mold. This runner is generally made of polyethylene or any other material capable of helping the ski to slide. The ski edges (7), made especially of steel, are then deposited on the two side edges of the runner (6).

Over the runner is deposited a first set constituting the first half-casing, made up of a stiffening member (Zicral) precoated with adhesive (8) and of a textile sheet preimpregnated with an epoxy resin (9), respectively. As can be seen in FIG. 5, this sheet has side extensions (19) intended to be positioned in the gap (4) defined by the lower (1) and upper (2) cavities of the mold.

A flattened tubular sheath (10) is then deposited flat on this first stiffening set. This tubular sheath made, for example, of plastic is capable of being stretched in the direction corresponding to the plane of its section. It is capable of adhering to the epoxy resin preimpregnating the textile sheet (9) and to the polyurethane foam whose reactants are injected into, the sheath at a later stage. As already mentioned, this sheath (10) is advantageously made of amide-block polyether.

This sheath exhibits the fundamental feature of not being tearable and of being capable of withstanding temperatures not exceeding 180° C. (temperature at the core of the mold).

A second set is then positioned above the sheath (10), constituting the second half-casing, made up, in this order, of a textile reinforcement sheet (12) preimpregnated with epoxy resin, whose side ends (18) are positioned above those (19) of the first sheet (9) in the gap (4) of the mold, and of a Zicral stiffening member (11) coated with adhesive.

This textile sheet (12) is capable of sliding in the plane of the section shown in FIG. 5 in order to adapt to the shape of the ski.

An adhesive-coated thermoplastic finishing member (13) used especially for carrying the decoration is then positioned above this second stiffening set (11, 12). This plate is made of ABS and is suitable for adhesive bonding onto the stiffening member (12). The side edges (17) of the thermoplastic member (13) are also positioned in the gap (4) of the mold.

In actual fact, the thickness of this gap (4) defined by the lower (1) and upper (2) cavities of the mold is equal to the sum of the thicknesses of the side edges (17, 18, 19) of the thermoplastic decorative member (13), of the upper textile reinforcement sheet (12) and of the lower textile reinforcement sheet (9) respectively, in order to permit the sliding of the said side edges toward the interior of the structure when the reactants intended to form the foam expand.

These various members are stacked flat over each other, in contact with each other. To do this, before being positioned in the mold, they have undergone a precutting to the correct dimensions, their surfaces are suitable for adhesive bonding, the fibers of the textile sheets (9) and (12) have, as already said, been subjected beforehand to a preimpregnation with the fast-polymerizing epoxy resin, and the upper member (13) made of transparent thermoplastic is predecorated, the decoration being visible owing to the transparency of the material.

As can be seen in FIGS. 5 and 6, the upper cavity (2) of the mold has internal side walls (15, 16) which are inclined relative to the vertical. As a result, the mold is trapezoidal in section. It should be noted that the two cavities (1, 2) of the mold are not hermetic. In fact, at least one vent is capable of allowing the air present inside the mold to pass through when the reactants forming the foam are injected.

When all the various members are in position in the mold, the latter is closed and the reactants of the polyurethane foam, a polyol and an isocyanate in this case, are injected into the sheath (10) close to one of its ends, these agents reacting in contact with each other and expanding in situ, causing the sheath to stretch in the plane of the section of the ski, and consequently laying the upper strengthening members (11) and (12) and the upper decorative member (13) flat against the side (15, 16) and upper (20) walls of the mold. Correspondingly, bearing in mind this laying flat, there is a slight retraction of the side edges of the textile reinforcement sheet (12) and of the upper decorative member (13).

Figure 9:
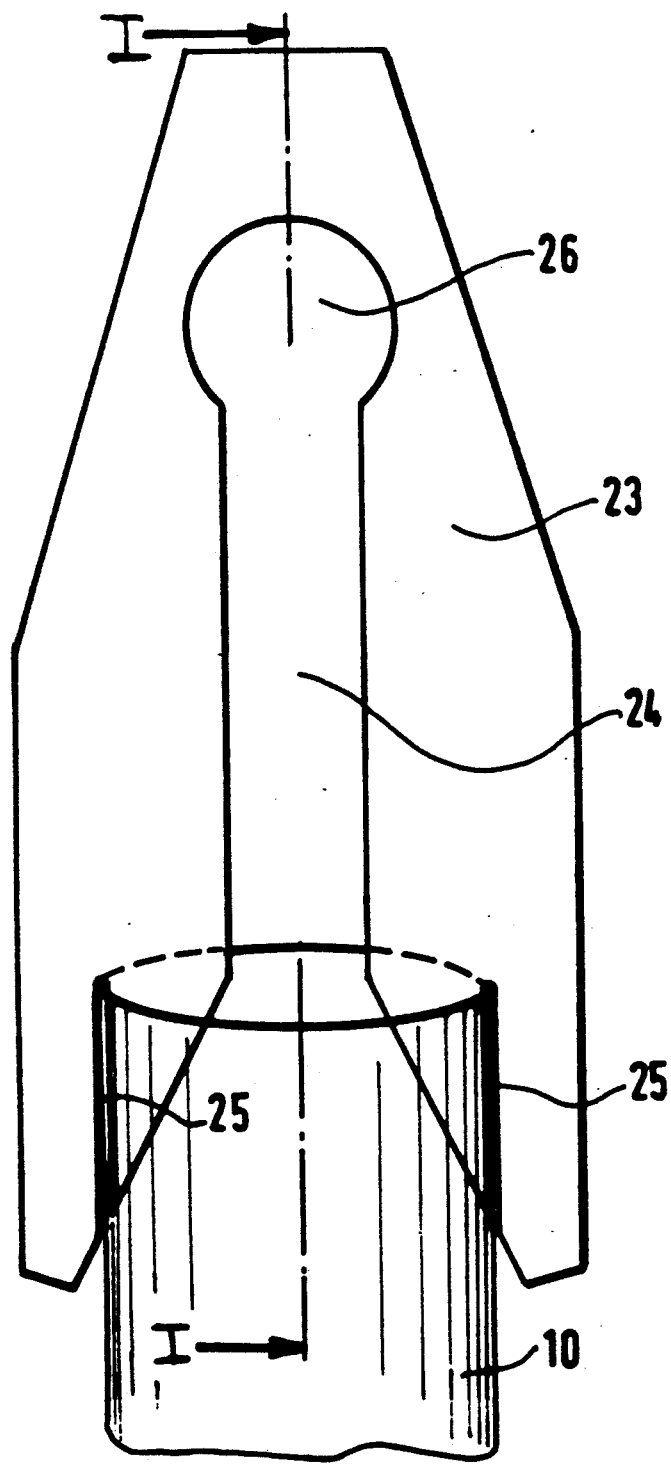
FIG. 9 is a diagrammatic illustration of the insert intended to permit the injection of the reactants via the tip of a ski, during its production.
Figure 10:
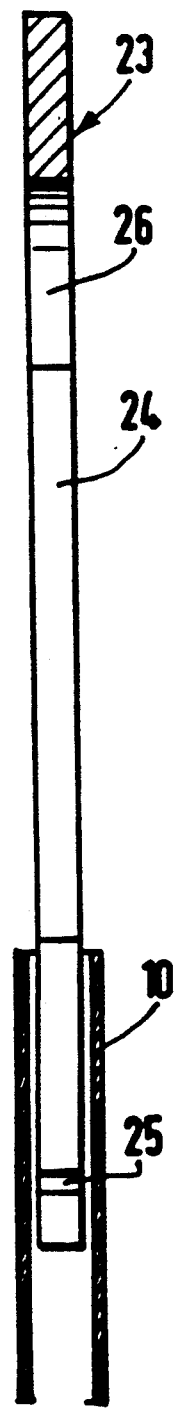
FIG. 10 is a lengthwise section along the line I—I of the insert of FIG. 9.
Figure 11:
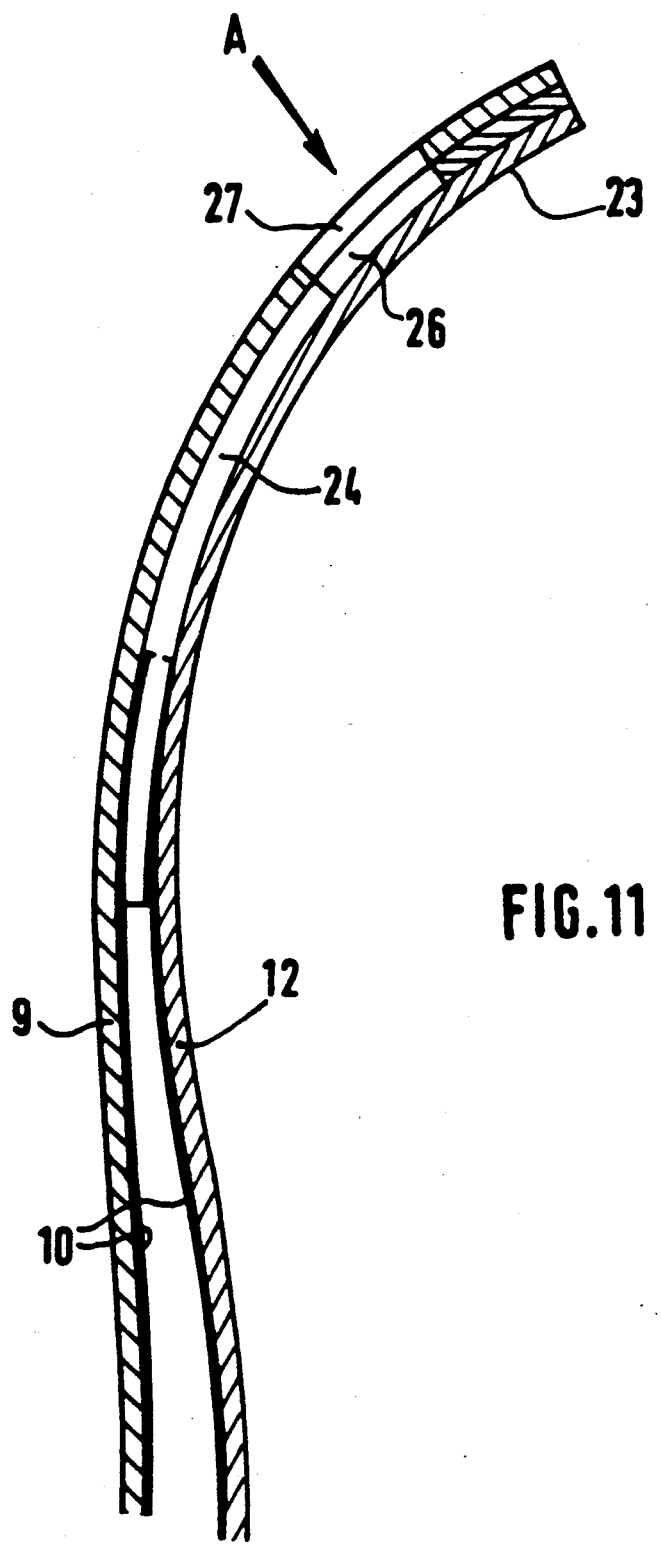
FIG. 11 is a lengthwise section in the plane of the front region of a ski equipped with the insert of FIG. 9.

FIGS. 9, 10 and 11 show a suitable component for permitting the injection of the reactants which, after reacting, form the foam of the core (14) inside the sheath (10), when this injection takes place by means of the ski tip. This component consists, in fact, of an insert (23) of appropriate shape, and especially one tapered to conform to the profile of the ski tip. This insert (23) made, for example, of plastic, has a middle slot (24) intended to act as a channel when the insert is in position in the mold. In addition, it has two substantially parallel cutouts (25) on each side of the said slot (24). These cutouts are intended to provide the fastening of the sheath (10) to the insert (24), in order to permit the injection of the foam reactants into the sheath.

As shown in FIG. 11, the insert (23) is positioned in the mold between the lower half-casing (9) and the upper half-casing (12) at the ski tip. Before the latter is positioned, the sheath (10) is positioned in the mold, care being taken to insert it properly at the two cutouts (25). When the mold is closed, the slot (24) of the insert is bounded by the two half-casings (9, 12), so that the whole defines a channel opening into the sheath (10). The other end of the slot (24) opens out at a region (26) in communication with an orifice (27) passing through the lower half-casing (9) and hence the runner and the lower cavity (1) of the mold. The injection of the foam reactants (14) into the sheath (10) takes place through this orifice, according to the arrow A which appears in FIG. 11. This orifice (27) is plugged by any suitable means after injection.

After cooling the mold and demolding, a molded composite structure is obtained, of trapezoidal section corresponding to the section of the mold and having side burrs in the plane of the joint. Side trimming is then carried out in order to obtain an alignment of the lower side wall of the ski with the edges (7), this being done using any suitable means.

FIGS. 12 and 13 show another embodiment of the insert (23). In this case the insert (23) shown is more particularly suited to the injection of the constituents of the foam (14) via the truncated section (29) of the ski tip. The insert of FIG. 9 is itself truncated and is held in place in the mold by means of positioning studs (not shown) interacting with appropriate orifices (28) forming an integral part of the insert (23) and arranged, on the one hand, at the truncated part of the insert and, on the other, at the base of the insert which is situated in the vicinity of the cutouts (25) for holding the sheath (10). These orifices (28) are removed once the ski has been completed, merely by trimming off. In this particular case the injection is carried out directly at the end of a ski tip, according to the arrow B which appears in FIG. 13.

In an alternative form of the above embodiment, it is possible to imagine injecting the reactants of the foam (14) via the heel of the ski, the insert (23) being then of an appropriate shape. The heel protector of the ski is then added after the ski is demolded.

The essential feature of the structure thus obtained with inclined side edges lies in the fact that the polyurethane foam forming the core is separated by a resilient sheath from the members forming the two half-casings.

Advantageously, and when this is required, the sheath (10) may be made of a material which is capable of being stretched and also viscoelastic, capable of providing some damping. Similarly, the sheath (10) can be strengthened locally, especially at the folds, using members precoated with adhesive. Similarly, this sheath (10) may comprise local extra thicknesses in order to produce selective damping.

Figure 7:
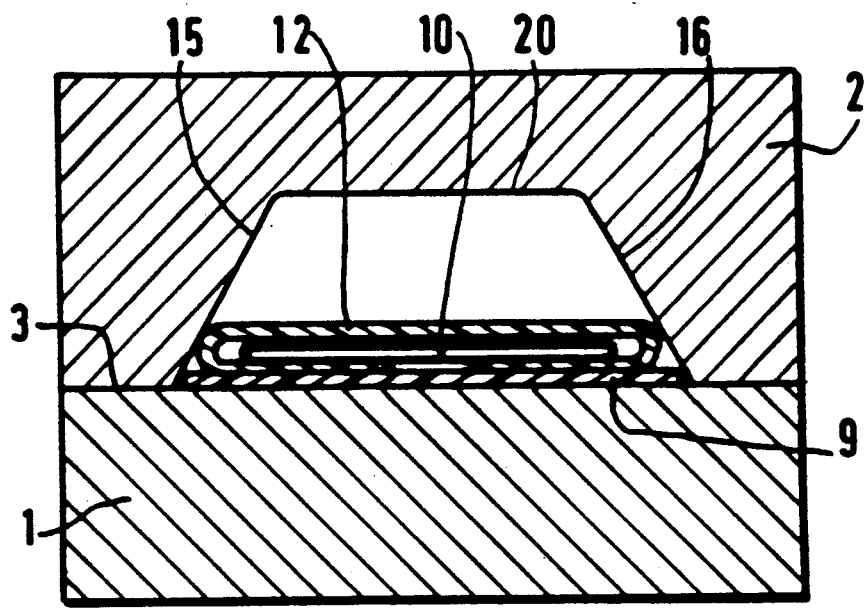
FIG. 7 is a cross-section of a mold according to another embodiment of the invention before injection of the reactants which form the foam.
Figure 8:
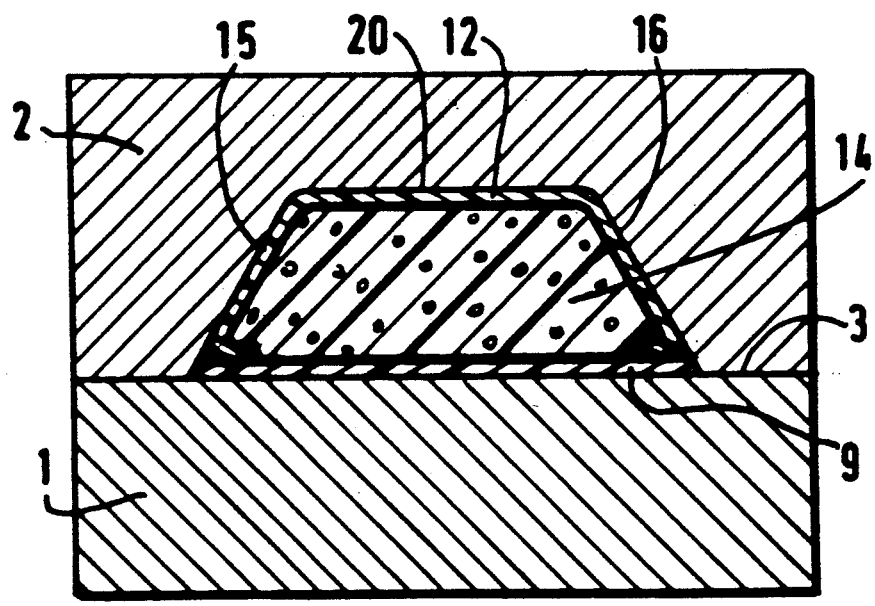
FIG. 8 is a cross-section of the mold of FIG. 7, obtained according to this other embodiment, after expansion of the foam.

In another embodiment shown in FIGS. 7 and 8 the mold is devoid of any side gap. The ends of the upper textile reinforcement sheet (12) are folded back underneath when the various members are installed in the mold. As a result, unfolding followed by laying of the textile strengthening sheet (12) flat against the upper wall (20) and against the side walls (15, 16) of the mold take place simultaneously. The structure obtained after demolding can actually be employed directly without having to resort to any trimming.

Among the advantages offered by this process there may be mentioned a simplicity of implementation, bearing in mind the stacking of the various components flat before the mold is closed.

In addition, such a process makes it possible to obtain molded structures of developed and complex sections, especially skis, sailboards, and the like.

Above all, this process exhibits the fundamental advantage of permitting the use of different resins, possibly mutually incompatible, a result which was until now prohibited, bearing in mind the manufacturing processes. This result is especially inherent in the particular choice of the membranes or sheath of the invention, which perform a triple function:

first of all, the function of intermediary for laying the subassemblies of half-casings flat against the walls of the mold under the effect of the pressure of expansion of the polyurethane foam;

next, the function of adhesive bonding intermediary between the resin-preimpregnated half-casings and the polyurethane foam constituting the core;

and, lastly, the function of a barrier to the mixing of incompatible resins.

Quite obviously, this process is not limited to the production of composite molded structures of trapezoidal section, but also to such structures of rectangular, square, elliptical, ovoid, circular, polygonal and similar sections, this being possible without departing from the scope of the invention.

We claim:

1. A process for manufacturing a ski from substantially flat stock materials, said ski having a distinct cross-sectional shape and consisting of a plastic foam core and upper and lower half-casings formed on respective upper and lower peripheral surfaces of said plastic foam core, said upper half-casing unitarily forming upper and side surfaces of the ski, said process comprising:

arranging in a lower portion of a mold a first substantially flat sub-assembly which forms said lower half-casing;

arranging in said mold a second substantially flat subassembly which forms said upper half-casing;

arranging at least one flexible plastic membrane between said first sub-assembly and said second sub-assembly, said at least one membrane being adherable to said plastic foam core and to said half-casings;

closing said mold, such that when said mold is closed, said at least one flexible plastic membrane forms a sheath within said mold between the first and second sub-assemblies;

pressure injecting into said sheath reactants which react to form a foam which expands in situ, until said sheath substantially fully urges the sub-assemblies against upper and lower inner surface walls of the respective upper and lower portions of said mold, wherein said edges of said upper sub-assembly slide within said mold to allow the sub-assemblies to be urged substantially fully against inner surface walls of said mold;

cooling all contents within the mold to form said ski; and opening the mold to remove said ski.

2. The process of claim 1, wherein the flexible plastic memberane is imperious to the products generated during expansion of the foam core.

3. The process of claim 1, wherein the flexible plastic membrane is of composite structure comprising at least two layers of different materials.

4. The process of claim 1, wherein the flexible plastic membrane is made of a viscoelstic material, thus forming a damping film surrounding the plastic foam core of the ski.

5. The process of claim 1, wherein said at least one flexible plastic membrane consists of a tubular sheath.

* * * * *